United States Patent [19]

Dumoulin

[11] Patent Number: 4,524,194

[45] Date of Patent: Jun. 18, 1985

[54] PROCESS FOR THE POLYMERIZATION OF VINYLIDENE FLUORIDE, IN AN AQUEOUS SUSPENDING MEDIUM, IN THE PRESENCE OF BIS(ALKYL) CARBONATE CHAIN REGULATORS

[75] Inventor: Joseph Dumoulin, Wezembeek-Oppem, Belgium

[73] Assignee: Solvay & Cie. (Societe Anonyme), Brussels, Belgium

[21] Appl. No.: 585,222

[22] Filed: Feb. 29, 1984

[30] Foreign Application Priority Data

Mar. 10, 1983 [FR] France .............................. 83 04106

[51] Int. Cl.³ .................... C08F 2/38; C08F 114/22
[52] U.S. Cl. ...................................... 526/84; 526/89; 526/255
[58] Field of Search .......................... 526/84, 89, 255

[56] References Cited

U.S. PATENT DOCUMENTS

| | | | |
|---|---|---|---|
| 3,707,592 | 12/1972 | Ishii et al. | 526/255 |
| 3,708,463 | 1/1973 | Stallings | 526/255 |
| 3,723,387 | 3/1973 | Nyce | 526/255 |
| 3,780,007 | 12/1973 | Stallings | 526/255 |
| 3,781,265 | 12/1973 | Dohany | 526/255 |
| 4,360,652 | 11/1982 | Dohany | 526/210 |

FOREIGN PATENT DOCUMENTS 1094558  12/1967  United Kingdom .

Primary Examiner—Harry Wong, Jr.
Attorney, Agent, or Firm—Spencer & Frank

[57] ABSTRACT

Process for the polymerization, in an aqueous suspending medium, of vinylidene fluoride with the aid of an oil-soluble free radical polymerization initiator in the presence of a suspending agent and a chain regulator chosen from the bis(alkyl) carbonates, the alkyl groupings of which contain not more that five carbon atoms wherein the molecular weight of vinylidene fluoride polymers are effectively regulated without having a detrimental effect on the polymerization yield, thus the vinylidene fluoride polymers have a good stability to heat.

19 Claims, No Drawings

PROCESS FOR THE POLYMERIZATION OF VINYLIDENE FLUORIDE, IN AN AQUEOUS SUSPENDING MEDIUM, IN THE PRESENCE OF BIS(ALKYL) CARBONATE CHAIN REGULATORS

The present invention relates to a process for the polymerisation, in an aqueous suspending medium, of vinylidene fluoride with the aid of a oil-soluble free radical polymerisation initiator and in the presence of a suspending agent and a chain regulator.

It is known, on the one hand, that residues of oil-soluble free radical polymerisation initiators present in vinylidene fluoride polymers after polymerisation alter the stability of the polymers to heat, and, on the other hand, that a large number of oil-soluble initiators usually employed for initiating free radical polymerisation of vinylidene fluoride concomitantly act as chain regulators. When seeking to improve the stability of vinylidene fluoride polymers to heat by reducing the amount of free radical oil-soluble initiator used in the polymerisation, it is in general appropriate to use conjointly a chain regulator so that the workability of the resulting polymers is not affected.

British Pat. No. A-1,094,558 (KUREHA KAGAKU KKK) describes aqueous suspension polymerisation of vinylidene fluoride in the presence of chain regulators chosen, preferably, from ketones containing three or four carbon atoms and saturated alcohols containing 3 to 6 carbon atoms in their molecule. However, it has been shown that these chain regulators have disadvantages. Some of them are of low effectiveness, that is to say it is necessary to use them in relatively large amount to obtain an appreciable regulator effect. Others, which are more effective, lead to a not insignificant slowing down of the polymerisation.

The aim of the present invention is to obtain chain regulators which do not have the abovementioned disadvantages.

The present invention to this purpose relates to a process for the polymerisation, in an aqueous suspending medium, of vinylidene fluoride with the aid of an oil-soluble free radical polymerisation initiator in the presence of a suspending agent and a chain regulator, in which the chain regulator is a bis(alkyl) carbonate, the alkyl groupings of which contain not more than five carbon atoms.

The most effective bis(alkyl) carbonates, which are consequently preferred, are those in which the alkyl groupings contain 1 to 3 methylene groupings ($-CH_2-$). Examples of such bis(alkyl) carbonates which may be mentioned are bis(ethyl), bis(n-propyl), bis(n-butyl), bis(sec.-butyl), bis(iso-butyl), bis(iso-amyl) and bis(neopentyl) carbonate.

A very particularly preferred bis(alkyl) carbonate is bis(ethyl) carbonate.

The amount of chain regulator used is not particularly critical. It depends, of course, on the molecular weight, and thus on the intrinsic viscosity, which it is desired to confer on the polymer and on the amount of initiator used. In general, about 0.05 to 2.5% by weight of regulator, based on the monomer used, is employed, which allows preparation of vinylidene fluoride polymers having intrinsic viscosities of from about 0.05 to 0.2 liter/g and thus enables the whole range of the usual techniques for transforming these polymers into shaped articles to be covered. Within this zone of concentrations, the optimum amount of regulator will advantageously be chosen experimentally as a function of the polymerisation conditions and of the intended result.

The chain regulator can be used in total at the start of the polymerisation, or it can be used in portions or continuously during the course of the polymerisation.

In the process according to the invention, the polymerisation can be initiated with the aid of the usual oil-soluble initiators for the free radical polymerisation of vinylidene fluoride. Representative examples of such initiators are the dialkyl peroxydicarbonates, acetylcyclohexanesulphonyl peroxide, dibenzoyl peroxide, dicumyl peroxide, the t-alkyl perbenzoates and the t-alkyl perpivalates. Nevertheless, preference is given to the dialkyl peroxydicarbonates, such as diethyl and di-isopropyl peroxydicarbonate, and to the t-alkyl perpivalates, such as t-butyl and t-amyl perpivalates, and more particularly to the t-alkyl perpivalates.

The amount of oil-soluble initiator used in the polymerisation is not critical. The usual amounts of initiator, that is to say about 0.05 to 3% by weight, based on the monomer used, can thus be employed. Nevertheless, about 0.05 to 0.5% by weight of initiator is preferably used, this ensuring that the polymer obtained has a good stability to heat. Under these conditions, about 0.5 to 2% by weight of chain regulator is in general used.

Like the chain regulator, the initiator can be used in total at the start of the polymerisation or can be used in portions or continuously in the course of the polymerisation.

The nature of the suspending agent used in the process according to the invention is also not critical. It can thus be chosen from among the usual suspending agents employed for free radical polymerisation in an aqueous suspending medium, such as polyvinyl alcohols and water-soluble cellulose derivatives, such as the alkyl- and alkylhydroxyalkyl-celluloses.

The amount of suspending agent is usually between 0.1 and 5 per thousand, based on the monomer used. The best results are obtained if 0.5 to 2 per thousand by weight is used.

The polymerisation temperature can be either below or above the critical temperature of vinylidene fluoride (30.1° C.). If the temperature is below 30.1° C., the polymerisation is carried out within a conventional aqueous suspension of liquid vinylidene fluoride under a pressure equal to the saturation vapour pressure of vinylidene fluoride. If the temperature is above 30.1° C., it is carried out within an aqueous suspension of gaseous vinylidene fluoride, which is advantageously under increased pressure. The process according to the invention can thus be carried out at temperatures in the range from room temperature to about 110° C. However, the polymerisation is preferably carried out at a temperature above 30.1° C. According to a preferred embodiment of the process according to the invention, the polymerisation of vinylidene fluoride is carried out at a temperature between 35° and 100° C. under initial pressures of about 55 to 200 bar. The productivity of the reactors can, of course, be increased by proceeding, in the course of the polymerisation in a manner which is known per se, with supplementary injections of monomer or water or with an increase in the polymerisation temperature.

The process, according to the invention, for the polymerisation of vinylidene fluoride can be applied both to continuous polymerisation and to batchwise polymerisation. However, preference is given to batchwise polymerisation.

Polymerisation of vinylidene fluoride is understood as meaning homopolymerisation of vinylidene fluoride as well as copolymerisation of mixtures of monomers with a predominant content, preferably greater than 85 mol %, of vinylidene fluoride, such as, for example, mixtures of vinylidene fluoride and other fluorinated olefines, such as vinyl fluoride, trifluoroethylene, chlorotrifluoroethylene, tetrafluoroethylene and hexafluoropropylene.

The process according to the invention enables the molecular weight of vinylidene fluoride polymers to be effectively regulated without a detrimental effect on the polymerisation yield. It leads to vinylidene fluoride polymers which have a good stability to heat.

The examples which follow are intended to illustrate the process according to the invention, but without limiting its scope.

Examples 1, 5 and 7 illustrate the process according to the invention. Examples 2, 3 and 6, for comparison, illustrate the use of chain regulators of the prior art. Example 4, for comparison, illustrates polymerisation in the absence of a chain regulator.

EXAMPLE 1

3,300 cm$^3$ of demineralized water, in which 1.1 g of hydroxypropylmethylcellulose has first been dissolved, are introduced successively into a 5-liter autoclave equipped with a stirrer with 2 blades inclined at 45° and a double-walled jacket. Most of the oxygen present in the autoclave is removed by evacuating to 40 mbar (at 15° C.) 3 times and, after each evacuation, returning the autoclave to a pressure of 1 bar of nitrogen. Whilst flushing the top of the autoclave with nitrogen, the initiator and the regulator are then introduced. The autoclave is evacuated again to 133.3 mbar. Stirring is started at 500 revolutions/minute, 1,100 g of vinylidine fluoride are injected in and the reactor is heated progressively up to the maximum temperature, without the maximum pressure indicated in Table 1 being exceeded. The polymerisation is stopped after 3 hours 30 minutes. The aqueous suspension is degassed (by reducing the pressure to atmospheric pressure) and the polymer is washed via a centrifuge until the washing waters no longer contain foam. The polymer is dried to constant weight in a drying cabinet at 60° C.

Examples 2 to 7 are carried out by the general procedure of Example 1.

The attached Table 1 shows the nature and amount of the initiator and chain regulator used, the maximum temperature and pressure reached in the course of the polymerisation and the duration and yield of the polymerisation.

The attached Table II shows the results of the evaluation of the intrinsic viscosity and heat stability of the poly(vinylidene fluorides) obtained.

The intrinsic viscosity [$\eta$], expressed in liter/g, has been calculated from the specific viscosity measured at 110° C. in a solution of 2 g/liter of poly(vinylidene fluoride) in dimethylformamide according to the formula:

$$[\eta] = \text{limit of} \left( \frac{\text{specific viscosity}}{\text{concentration}} \right) \text{ for } C = 0$$

The heat stability was evaluated on sheets pressed for 30 minutes at 225° C. from poly(vinylidene fluoride) granulated at 220° C. The pressed sheets were subjected to reheating at 165° C. for 72 hours, after which their yellow index (YI) was measured.

Comparison of Examples 1, 3 and 5 shows the superiority of bis(ethyl)carbonate over acetone in respect to effectiveness in regulating the intrinsic viscosity, and thus the molecular weight of the poly(vinylidene fluoride).

Comparison of Examples 1 and 2, on the one hand, and Examples 5 and 6, on the other hand, shows the superiority of bis(ethyl)carbonate over methyl ethyl ketone and, respectively, isopropanol in respect of the polymerisation yield and the stability of the poly(vinylidene fluoride) to heat.

TABLE I

| | Polymerisation conditions | | | | | | | |
|---|---|---|---|---|---|---|---|---|
| Example No. | Initiator | | Chain regulator | | Maximum temperature °C. | Maximum pressure bar | Total duration h. min. | Yield % |
| | Nature | Amount, g | Nature | Amount, g | | | | |
| 1 | IPP* | 3 | bis(ethyl) carbonate | 5 | 60 | 70 | 3 h 30 min | >90 |
| 2 | " | 3 | methyl ethyl ketone | 5 | 60 | 70 | 5 h | 25 |
| 3 | " | 3 | acetone | 15 | 60 | 70 | 3 h 30 min | >90 |
| 4 | " | 10 | none | — | 40 | 65 | 3 h 30 min | >90 |
| 5 | " | 3 | bis(ethyl) carbonate | 15 | 60 | 70 | 3 h 30 min | >90 |
| 6 | " | 3 | isopropanol | 15 | 60 | 70 | 5 h | 70 |
| 7 | TAPPI** | 4 | bis(ethyl) carbonate | 10 | 65 | 85 | 6 h | 80 |

IPP*: di-isopropyl peroxydicarbonate
TAPPI**: tert.-amyl perpivalate

TABLE II

| Evaluation of the poly(vinylidene fluoride) | | |
|---|---|---|
| Example No. | Intrinsic viscosity [$\eta$], l/g | Heat stability YI |
| 1 | 0.12 | 35 |
| 2 | 0.07 | 90 |
| 3 | 0.13 | 35 |
| 4 | 0.12 | 70 |
| 5 | 0.08 | 35 |
| 6 | 0.08 | 50 |
| 7 | 0.09 | 25 |

I claim:
1. Process for the polymerisation, in an aqueous suspending medium, of vinylidene fluoride with the aid of an oil-soluble free radical polymerisation initiator in the presence of a suspending agent and a chain regulator, characterised in that the chain regulator is a bis(alkyl)- carbonate, the alkyl groupings of which contain not more than five carbon atoms and the initiator, the suspending agent and the chain regulator are present in effective amounts; the molecular weight of the vinylidene fluoride polymer produced being dependent on the amount of chain regulator present, and the amount of chain regulator used in the process being selected according to the polymer molecular weight desired.

2. Process according to claim 1, characterised in that the alkyl groupings of the bis(alkyl)carbonate contain 1 to 3 methylene groupings.

3. Process according to claim 1, characterised in that the amount of chain regulator used is between 0.05 and 2.5% by weight, based on the monomer.

4. Process according to claim 1, characterised in that it is applied to polymerisation at a temperature above 30.1° C.

5. Process according to claim 4, characterised in that it is applied to polymerisation at a temperature of between 35° and 100° C. under an initial pressure of 55 to 200 bar.

6. Process according to claim 2, characterized in that the bis(alkyl)carbonate is bis(ethyl)carbonate.

7. Process according to claim 3, characterised in that the amount of chain regulator used is between 0.5 and 2% by weight and the amount of initiator used is between 0.05 and 0.5% by weight, based on the monomer.

8. Process according to claim 2, characterised in that it is applied to polymerisation at a temperature above 30.1° C.

9. Process according to claim 3, characterised in that it is applied to polymerisation at a temperature above 30.1° C.

10. Process according to claim 6, characterised in that it is applied to polymerisation at a temperature above 30.1° C.

11. Process according to claim 7, characterised in that it is applied to polymerisation at a temperature above 30.1° C.

12. Process according to claim 8, characterised in that it is applied to polymerisation at a temperature of between 35° and 100° C. under an initial pressure of 55 to 200 bar.

13. Process according to claim 9, characterised in that it is applied to polymerisation at a temperature of between 35° and 100° C. under an initial pressure of 55 to 200 bar.

14. Process according to claim 10, characterised in that it is applied to polymerisation at a temperature of between 35° and 100° C. under an initial pressure of 55 to 200 bar.

15. Process according to claim 11, characterised in that it is applied to polymerisation at a temperature of between 35° and 100° C. under an initial pressure of 55 to 200 bar.

16. Process for the polymerisation, in an aqueous suspending medium, of vinylidene fluoride with the aid of an oil-soluble free radical polymerisation initiator in the presence of a suspending agent and a chain regulator, characterised in that the chain regulator is a bis(alkyl)carbonate, the alkyl groupings of which contain not more than five carbon atoms; the initiator and the suspending agent being present in effective amounts, and the chain regulator being present in an amount between 0.05 and 2.5% by weight, based on the monomer.

17. Process according to claim 16, wherein the alkyl groupings of the bis(alkyl)carbonate contain 1 to 3 methylene groupings.

18. Process according to claim 17, wherein the bis(alkyl)carbonate is bis(ethyl)carbonate.

19. Process according to claim 16, wherein the amount of chain regulator used is between 0.5 and 2% by weight and the amount of initiator used is between 0.05 and 0.5% by weight, based on the monomer.

* * * * *